US010937256B2

(12) United States Patent
Nakamura

(10) Patent No.: US 10,937,256 B2
(45) Date of Patent: Mar. 2, 2021

(54) SELF-DRIVING VEHICLE STOP POSITION NOTIFICATION SYSTEM AND VEHICLE STOP RANGE REGISTRATION METHOD

(71) Applicant: Kenta Nakamura, Osaka (JP)

(72) Inventor: Kenta Nakamura, Osaka (JP)

(73) Assignee: Kenta Nakamura, Osaka (JP)

( * ) Notice: Subject to any disclaimer, the term of this patent is extended or adjusted under 35 U.S.C. 154(b) by 0 days.

(21) Appl. No.: 16/777,184

(22) Filed: Jan. 30, 2020

(65) Prior Publication Data

US 2020/0286307 A1 Sep. 10, 2020

(30) Foreign Application Priority Data

Mar. 6, 2019 (JP) .............................. JP2019-041006

(51) Int. Cl.
| | |
|---|---|
| *G08G 1/123* | (2006.01) |
| *G07C 5/06* | (2006.01) |
| *G06K 9/00* | (2006.01) |
| *G07C 5/00* | (2006.01) |
| *H04N 5/232* | (2006.01) |
| *H04N 5/247* | (2006.01) |

(52) U.S. Cl.
CPC ........... *G07C 5/06* (2013.01); *G06K 9/00791* (2013.01); *G07C 5/008* (2013.01); *H04N 5/23203* (2013.01); *H04N 5/247* (2013.01)

(58) Field of Classification Search
CPC . G07C 5/06; G07C 5/008; G07C 5/02; G06K 9/00791; H04N 5/247; H04N 5/23203; G05D 1/0055; G05D 1/02; G05D 1/0088; G01C 21/30

See application file for complete search history.

(56) References Cited

U.S. PATENT DOCUMENTS

| | | | | |
|---|---|---|---|---|
| 9,983,582 B2* | 5/2018 | Nemec | ..................... | G05D 1/02 |
| 10,013,878 B2* | 7/2018 | Ricci | .................... | B60N 2/0244 |
| 10,809,721 B2* | 10/2020 | Urano | ................. | G01C 21/3617 |
| 10,857,994 B2* | 12/2020 | Iagnemma | ........... | G05D 1/0061 |

FOREIGN PATENT DOCUMENTS

JP 2016-057946 A 4/2016

\* cited by examiner

*Primary Examiner* — Toan N Pham
(74) *Attorney, Agent, or Firm* — Leason Ellis LLP

(57) ABSTRACT

Self-driving vehicle stop position notification system, comprising a management server for managing an autonomous driving support application for the self-driving vehicle, and a user terminal; wherein the user terminal instructs the self-driving vehicle to drive to the stop range specified by the vehicle stop range via the management server, and transmits an image captured by the camera when the self-driving vehicle stops in the stop range to the management server, the management server collates video information consisting of the image with the pre-registered video information of the vehicle stop range associated with a location information, determines the stop position based on the result, displays the stop position on a map, and notifies the stop position displayed on the map to the user terminal.

3 Claims, 4 Drawing Sheets

SELF-DRIVING VEHICLE STOP POSITION NOTIFICATION SYSTEM AND VEHICLE STOP RANGE REGISTRATION METHOD

This application claims the benefit of priority to Japanese Patent Application No. 2019-041006 filed on Mar. 6, 2019, the content of which is incorporated herein by reference.

BACKGROUND OF THE INVENTION

The present invention relates to a self-driving vehicle stop position notification system and vehicle stop range registration method Self-driving car management system with a recording unit that records information such as a parking space for parking an autonomous vehicle is known (see, for example, Japanese Laid open Patent No. 2016-57946). The system also has a control unit for controlling self-driving vehicles using driving information, and an automatic driving vehicle communication unit that receives position information from the automatic driving vehicle and transmits driving information regarding a parking space after the user gets off the vehicle.

SUMMARY OF THE INVENTION

However, in the conventional system, it is possible to automatically drive and stop at a predetermined parking space, but it is difficult to accurately stop the automatic driving vehicle at an arbitrary place. For example, when the position where the automatic driving vehicle is parked and the position where the user (or the driver) using the vehicle is located are far from each other, it is difficult to move the automatic driving vehicle to the user's location and stop it.

Furthermore, it is conceivable to identify the stop position of the vehicle by comparing the street image created by the existing application function with the image captured at the stop position of the vehicle. However, many of the images of this application function have a considerably old shooting date and time, and there are places where collation is impossible, and the time when the image data becomes the latest is not determined. For this reason, it is impossible to use existing applications. In addition, even when the current GPS function is improved and the stop position is directly displayed on the detailed map, there is an inappropriate location such as a high-rise building, so this is also impossible.

The present invention is to solve the above problem, and provides a position notification system and a vehicle stop range registration method, that can automatically display a stop position on a detailed map and automatically notify a user terminal of the stop position when the automatic driving vehicle automatically stops near a designated place and stops.

Self-driving vehicle stop position notification system of the present invention comprising:
 a self-driving vehicle,
 a management server that manages a self-driving support application of the vehicle, and
 a user terminal that can be connected to a network and downloads the self-driving support application from the management server, wherein
 the vehicle includes a self-driving control device that automatically drives the vehicle, and a camera that operates in response to an instruction from the user terminal so as to capture an image of a periphery of the vehicle,
 the self-driving control device, the management server, and the user terminal can be connected via the network,
 the management server comprising;
 a control unit for operating the self-driving support application,
 a first database in which information of the user terminal is registered in advance,
 a second database in which information for control operation of the vehicle is registered in advance,
 a third database in which a video information captured by the camera and location information on a map for specifying a vehicle stop range is registered in advance,
 a notifying unit for notifying the user terminal of the vehicle stop position information, and
 AI function unit that compares the video information specifying the vehicle stop range with the video information near the place where the vehicle actually stopped by the self-driving,
  the user terminal instructs the vehicle to travel and to stop within a rang specified by the vehicle stop range of the third database via the management server using the self-driving support application,
  the camera, when the vehicle stops within the vehicle stop range, capture an image of the periphery of the vehicle, and transmits the video information to the management server,
  the management server uses the AI function unit to collate the video information acquired as described above with the video information of the vehicle stop range in the third database, wherein both of video information are associated with the location information,
  determines the stop position of the vehicle based on the result of the above collation,
  displays the stop position on the map, and
  notifies the user terminal of the stop position displayed on the map.

The third database may be comprising: screen date for displaying and registering the vehicle stop range on a screen, map date for displaying on the screen, location information for specifying a start and end points of the vehicle stop range on the map, video information of the area around the start and end points.

Further, vehicle stop range registration method on the third database used in the above system of the present invention, comprising:
 a step of displaying a screen for registering the vehicle stop range in the automatic driving support application downloaded to the user terminal or the self-driving control device,
 a step of designating a start point and an end point of the vehicle stop range on the map displayed on the screen,
 a step in which the user gets on the self-driving vehicle, causes the self-driving vehicle to run automatically, starts the camera to shoot the periphery of the vehicle,
 a step of location information registering the start point when the self-driving vehicle passes the start point of the vehicle stop range, and registering the end point when passing the end point,
 a step of transmitting the video information captured by the camera and the location information to the management server;
 a step of registering in the third database based on the video information and the location information received in the management server.

According to the present invention, by registering the vehicle stop range in advance near the place of residence or any place where move operation instruction is given, when instructions are given to the self-driving vehicle to move to the vehicle stop range, the vehicle automatically travels near the specified location, and its stop position can be displayed on the detailed map, and the stop position can be accurately notified to the user terminal.

DETAILED DESCRIPTION OF THE INVENTION

A self-driving vehicle stop position notification system and vehicle stop range registration method in accordance with a first embodiment of the present invention is described with reference to FIGS.

Figure 1:
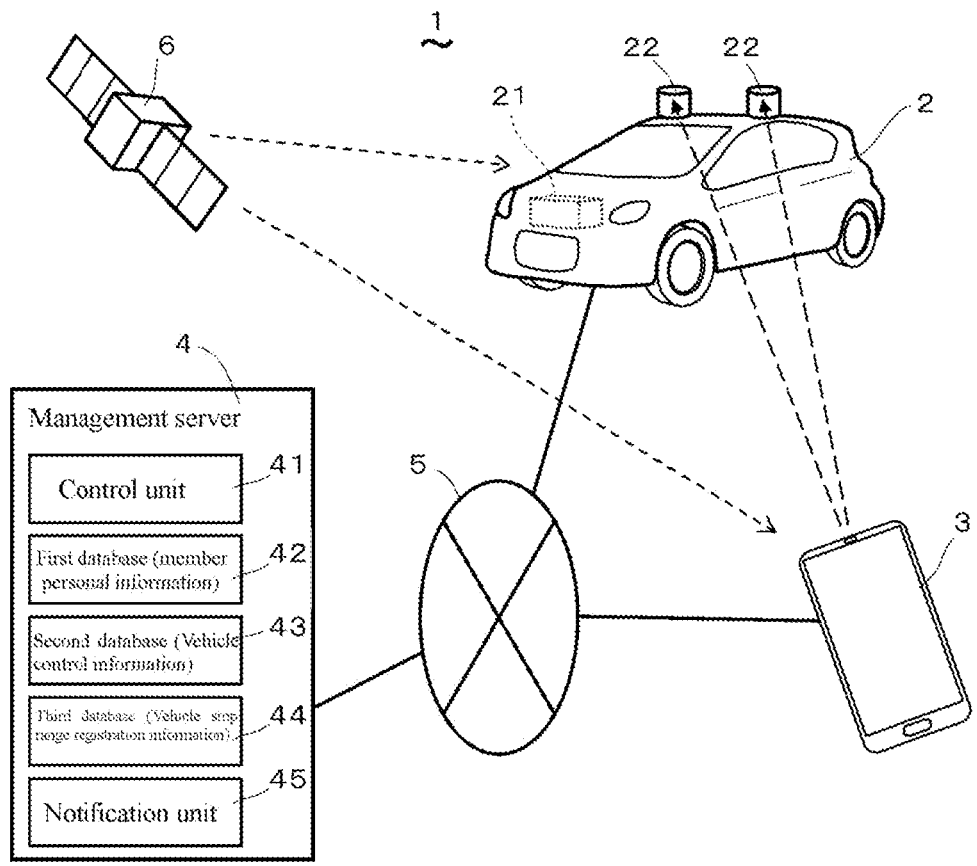
FIG. 1 is overall configuration diagram of the stop position notification system for self-driving vehicles according to the present invention.

FIG. 1 shows a self-driving vehicle stop position notification system 1 (hereinafter, referred to as the system) according to an embodiment. The system 1 uses a self-driving support application (hereinafter, referred to as the application) downloaded to a user terminal 3 owned by a user of the self-driving vehicle 2 (hereinafter, referred to as the vehicle) to move the vehicle 2 to a designated place. When instructed, the vehicle 2 arrives and stops near the designated location, and at that time, has a function of notifying the application of the user terminal 3 of the stop position and displaying the stop position on a detailed map.

The system 1 includes a vehicle 2, a user terminal 3 that can be connected to a network 5 and downloads the application from a management server 4, and a management server 4 that manages the application. The vehicle 2 is provided with a touch panel type self-driving control device 21 which can be connected to the network 5 and operates automatic traveling. The vehicle 2 and the user terminal 3 can acquire position information using the GPS function of the satellite 6.

The self-driving control device 21 has a terminal line function that can be connected to the management server 4 and the user terminal 3 via the network 5, and an AI (artificial intelligence) function that enables control operation of the self-driving. The vehicle 2 includes a camera 22 mounted on the vehicle 2 and capturing an image of the periphery of the vehicle 2. The camera 22 operates in response to an instruction from the user terminal 3 that has started the application or the operation panel of the self-driving control device 21. The application has a function of registering a vehicle stop range. At a time of the vehicle stop range registration, the camera 22 captures an image of the periphery of the vehicle 2 when the vehicle 2 stops within the stop range, and transmits the video information to the management server 4. The vehicle stop range is registered on the database 44.

The user terminal 3 is, for example, a smartphone which can be connected to the network 5 and can instruct so as to travel and move the vehicle 2 within the stop range in the vehicle stop range registration of the database 44 via the management server 4 using this application.

The management server 4 includes a control unit 41 that operates the application (the control unit includes an AI function), a first database 42 storing personal information of the member of the application, a second database 43 storing vehicle control information, a third database 44 that stores vehicle stop range registration information, and a notification unit 45 that notifies the user terminal 3 of vehicle stop position information. In the first database 42, personal information of the user terminal 3 of a customer who has joined the application is registered. In the second database 43, various kinds of information that can activate the proposed system are registered. In the third database 44, information including information on surrounding images, position information on a map, and the like is registered as a vehicle stop range for an arbitrary place or area desired by the user. When the information that the vehicle 2 has stopped within the stop range is notified to the application, the notification unit 45 notifies the user terminal 3 of the information using a short mail, a G-mail, a bush notification, or the like. The management server 4 is under the jurisdiction of a business entity that operates the application for a large number of customers.

In response to the instruction from the user terminal 3, the management server 4 instructs the control unit 41 to travel to the self-traveling control device 21 of the vehicle 2 using the database 43 and the database 44, and receives the video of the vehicle stop range captured by the camera 22. The management server 4 uses the AI function of the control unit 41 to collate the video information acquired from the camera 22 with the video information of the vehicle stop range registered in the database 44 in advance. The management server 4 determines the stop position of the vehicle 2 based on the collation result, displays the stop position on a map, and notifies the user terminal 3 of the stop position displayed on the map. The image information acquired from the camera 22 and the image information of the vehicle stop range are associated with the position information.

Figure 2:
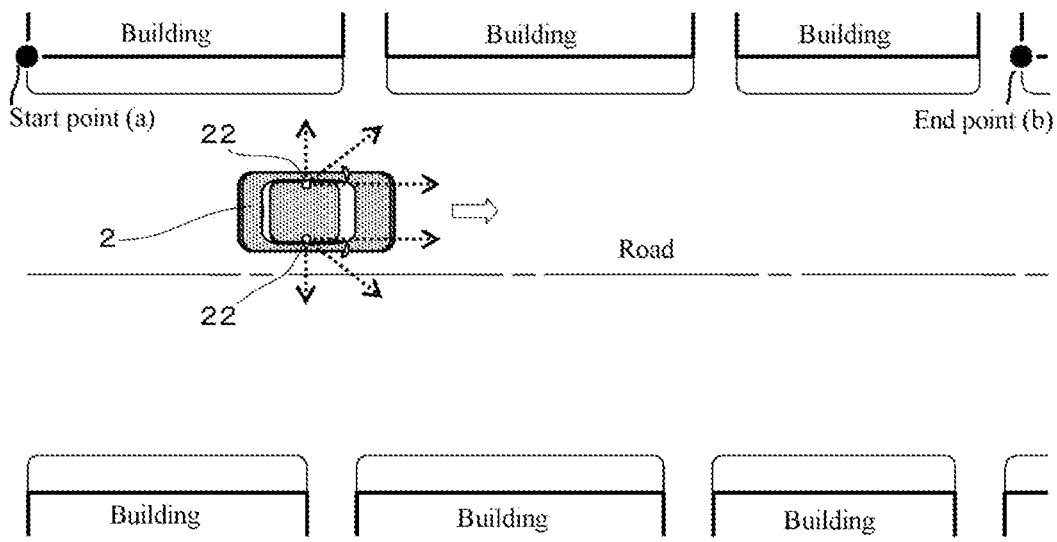
FIG. 2 is a plan view showing a situation in which a self-driving vehicle travels in a registered vehicle stop range.

FIG. 2 shows a situation in which the vehicle 2 travels in a range registered as a vehicle stop range. In the illustrated example, as a registered vehicle stop range, one corner of a street where a plurality of buildings are arranged facing a road that can be parked is set as a starting point (a), and another corner separated by a plurality of alleys therefrom is set as an end point (b). The registration method in advance is described later. When the vehicle 2 is located at a position away from the user and the vehicle 2 is called up near the place where the user is located, the vicinity of the place where the user is located is registered as the vehicle stop range. Thereby, the convenience of calling the vehicle 2 is enhanced. The vehicle 2 captures the surroundings by the camera 22 while self-driving in the area between the vehicle stop range registration points according to the present system, and searches for an empty space free of obstacles within the vehicle stop range and stops.

The camera 22 is mounted on the front part and the left and right parts of the vehicle body of the vehicle 2 and can be connected to the user terminal 3 and the like via a wireless LAN line such as a Wi-Fi line or a Bluetooth (registered trademark) function when the vehicle stop range is registered. Further, an operation can be performed using a touch panel of the self-driving control device 21 mounted on the vehicle 2, and the operation can be performed without the wireless LAN line. The camera 22 comprises multiple cameras. One of the cameras shoots vertically the road shoulder side outside each of the mounting positions of the left and right portions of the vehicle body. The other cameras shoot the left and right front sides, each intermediate direction side, and a side road at the bottom of the vehicle. Thus, a plurality of angles can be photographed. The captured image includes a moving image, a still image, and the like. After the registration of the vehicle stop range, the user terminal 3 performs the moving operation of the vehicle 2, and when the vehicle stops during the range registration, the camera 22 automatically performs the above-described shooting, and the information is transmitted to the management server 4.

Registration of Vehicle Stop Range

Figure 3:
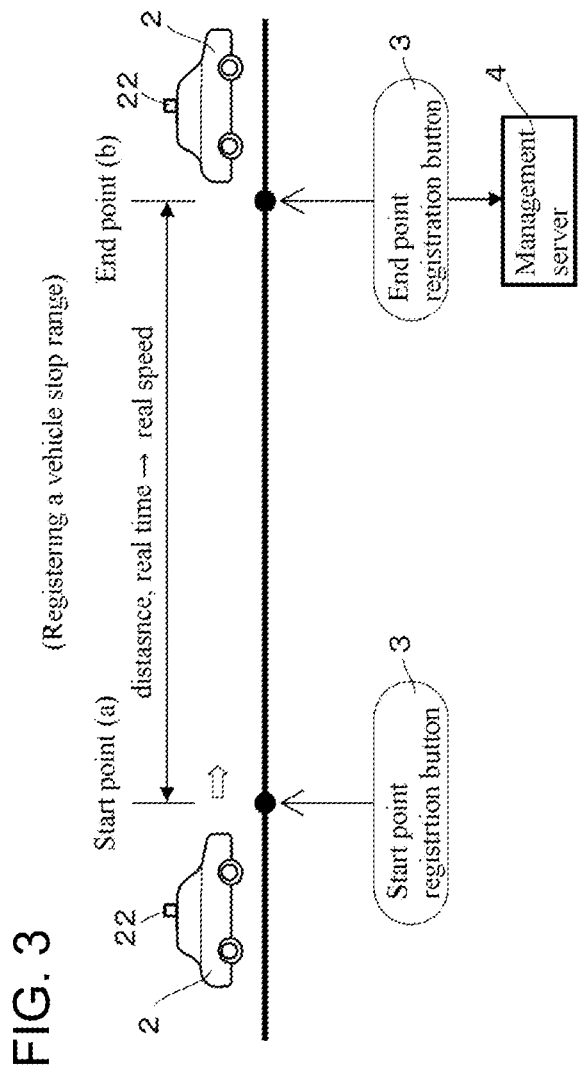
FIG. 3 is an explanatory drawing showing a vehicle stop range registration method according to an embodiment of the present invention.
Figure 4:
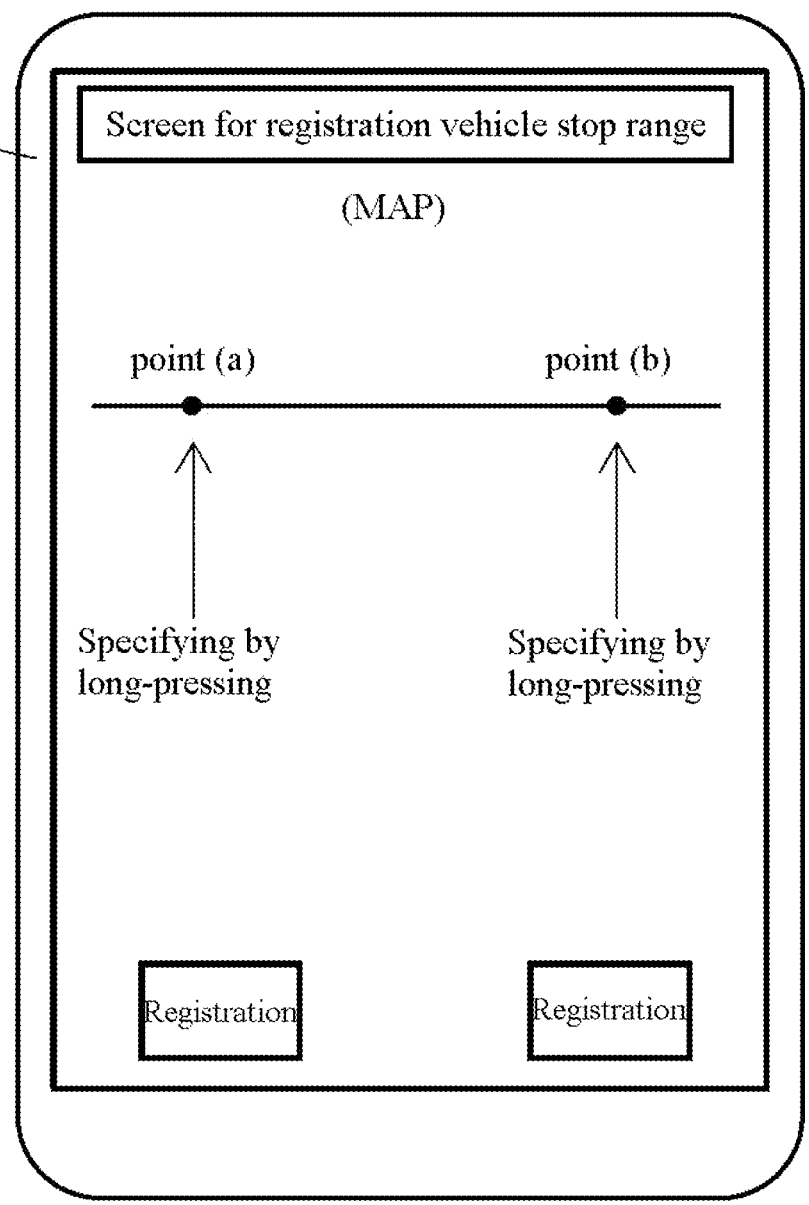
FIG. 4 is a view showing the screen of the driver terminal at the time of implementing the vehicle stop range registration method or the registration operation panel provided in a self-driving control device.
Figure 5:
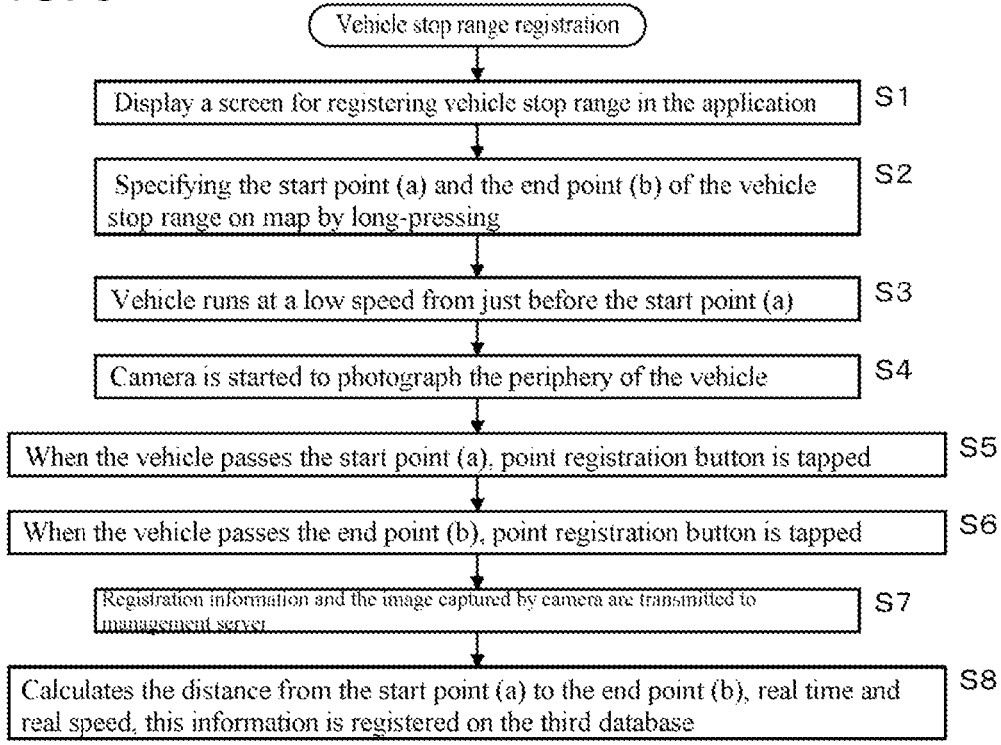
FIG. 5 is a flowchart which shows the processing procedure of a vehicle stop range registration method.

Next, a registration method of the third database 44 (vehicle stop range registration information) of the management server 4 will be described. FIG. 3 shows a method of registering a vehicle stop range, FIG. 4 shows a screen of an operation panel of the user terminal 3 or the self-driving control device 21 of the vehicle 2, and FIG. 5 shows a processing procedure of vehicle stop range registration. The vehicle stop range registration information includes an image of the vehicle stop range captured by the camera 22 of the vehicle 2 and the like.

The registration can be performed using the screen for registering the vehicle stop range in the present application downloaded to the user terminal 3 or using the screen of the operation panel of the self-driving control device 21 of the vehicle 2. Hereinafter, these screens are collectively referred to as an operation panel screen.

In order to make this registration, first, as shown in FIG. 4, on the operation panel screen of the user terminal 3, a screen for registering the vehicle stop range in the application is displayed. The screen includes detailed map of an arbitrary place desired by the user (steps S1 in FIG. 5). Instead, the screen may include the vicinity of the residence where the moving operation is normally instructed. Using the touch panel function capable of specifying the position on the operation panel screen, the start point (a) and the end point (b) of the vehicle stop range are specified on the map displayed on the screen by long-pressing each with the user's finger (steps S2 in FIG. 5). The registration in the vehicle stop range registration information on the third database 44 may be performed as needed.

Subsequently, the user gets on the vehicle 2 and, as shown in FIG. 3, causes the vehicle 2 to automatically run at a low speed from just before the start point (a) of the vehicle stop range (step S3 in FIG. 5), and the camera 22 is started to photograph the periphery of the vehicle 2 through the operation panel screen (step S4 in FIG. 5). After the start of traveling, the vehicle is driven at a constant low speed so that an image can be taken accurately. When the vehicle 2 passes the start point (a) of the vehicle stop range, the start point registration button on the operation panel screen is tapped (step S5 in FIG. 5), and when the vehicle 2 passes the end point (b), the operation panel is pressed by tapping the end point registration button on the screen (step S6 in FIG. 5), then the vehicle stop range is registered. The registration information and the image captured by the camera 22 are transmitted to the management server 4 (step S7 in FIG. 5).

The management server 4 calculates the distance from the start point (a) to the end point (b), the real time and the real speed (or the average speed) based on the received registration information by using the AI function. Further, based on the calculated data and the captured video, the longitude and latitude information for each screen of the captured video are obtained. Thereafter, the above information is registered on the third database 44 (step S8 in FIG. 5).

Figure 6:
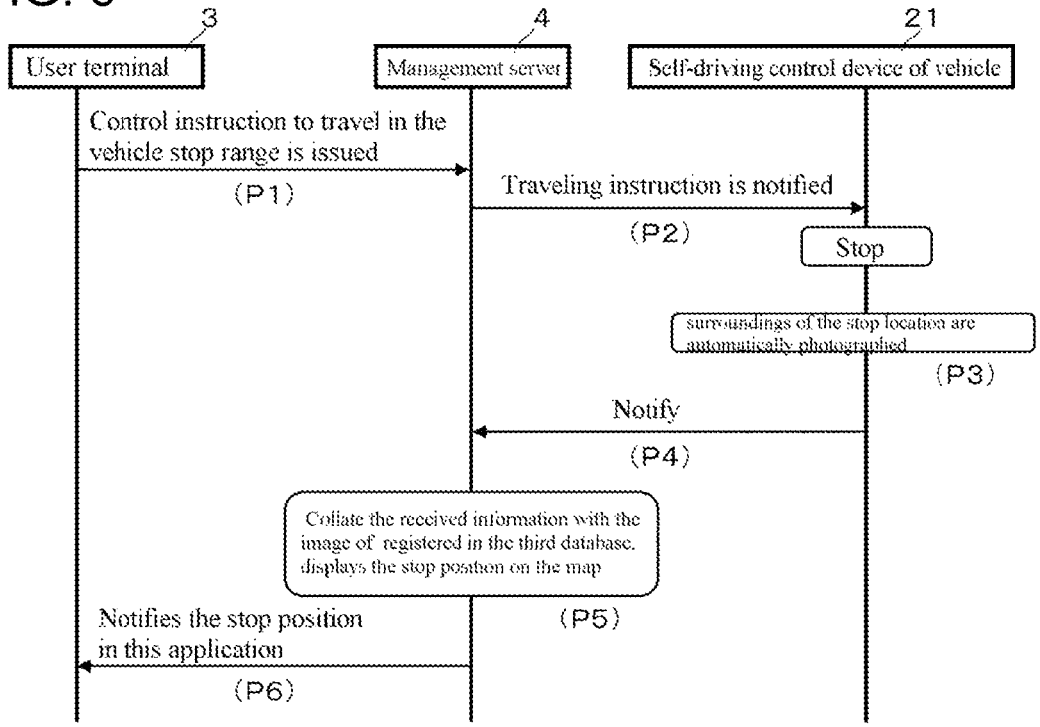
FIG. 6 is a time chart of the vehicle stop operation of the self-driving vehicle according to an embodiment.

Next, a vehicle stopping operation of the self-driving vehicle by the present system 1 will be described with reference to FIGS. 1 and 6. FIG. 6 is a time chart of the vehicle stop operation of the self-driving vehicle. When a control instruction is issued from the user terminal 3 to the management server 4 using the present application so that the vehicle 2 automatically travels in the vehicle stop range and stops (P1), the management server 4 uses the database 43 to instruct the vehicle 2. The traveling instruction is notified to the self-driving control device 21 (P2). As a result, automatic driving can be performed. When the vehicle 2 automatically travels within the vehicle stop range registration and stops, the surroundings of the stop location are automatically photographed by the camera 22 (P3), and the information is automatically notified to the management server 4 (P4).

The management server 4 uses the AI function to collate the received information with the information including the image in which the vehicle stop range is registered in the database 44, and displays the stop position on the detailed map of the stop (P5), and notifies the user terminal 3 of the detailed map so that the detailed map can be browsed in the application. At the same time, the management server 4 notifies the user terminal 3 that the stop position in this application can be confirmed using an email (P6).

Thus, by pre-registering an arbitrary place or area desired by the user as a vehicle stop range, when the vehicle 2 is instructed to move to the registered vehicle stop range, the vehicle 2 will be within the vehicle stop range. The vehicle stops automatically and the stop position is displayed on a map, and the user terminal 3 can be notified of the stop position with high accuracy.

By registering a certain wide area as the vehicle stop range registration, the vehicle 2 can automatically drive according to the available parking conditions on the road and stop within the range appropriately. For example, when the self-driving vehicle 2 is located at a location distant from the user, the user instructs the vehicle 2 to use the user terminal 3 to perform automatic driving to the vicinity of the location where the user is located (calls the vehicle 2), the vehicle 2 can stop by searching for an empty space where no obstacle exists within the vehicle stop range, and the user can accurately know the stop position from the user terminal 3.

The present invention is not limited to the configuration of the above embodiment, and various modifications are possible. For example, when using the present application to instruct the automatic driving vehicle 2 to move to a pick-up area (vehicle stop range), it is possible to notify the user terminal 3 of a stop position corresponding to a traffic situation. Further, the vehicle stop range registration is performed in the database 44 by pressing a point on the screen of the user terminal 3 or the operation panel of the self-driving control device 21 of the vehicle 2 using the touch panel function, tapping the point registration button, or the like. Although a method of performing the operation has been described, an appropriate alternative method having an equivalent function may be employed.

EXPLANATION OF REFERENCE NUMERALS

1 Stop position notification system for self-driving vehicle
2 Self-driving vehicle
21 Self-driving control device
22 Camera
3 User terminal
4 Management server
41 Control unit to operate this application
42 First database (Application member personal information)
43 Second database (Vehicle control information)
44 Third database (Vehicle stop range registration information)
45 Notification unit
5 Network

The invention claimed is:

1. Self-driving vehicle stop position notification system comprising: a self-driving vehicle;
a management server that manages a self-driving support application of the vehicle; and
a user terminal that can be connected to a network and downloads the self-driving support application from the management server, wherein
the vehicle includes a self-driving control device that automatically drives the vehicle, and a camera that operates in response to an instruction from the user terminal so as to capture an image of a periphery of the vehicle,
the self-driving control device, the management server, and the user terminal can be connected via the network,
the management server comprising;
a control unit for operating the self-driving support application, a first database in which information of the user terminal is registered in advance,
a second database in which information for control operation of the vehicle is registered in advance,
a third database in which a video information captured by the camera and location information on a map for specifying a vehicle stop range is registered in advance,
a notifying unit for notifying the user terminal of a vehicle stop position information, and
AI function unit that compares the video information specifying the vehicle stop range with the video information near a place where the vehicle actually stopped by the self-driving,
the user terminal instructs the vehicle to travel and to stop within a range specified by the vehicle stop range of the third database via the management server using the self-driving support application,
the camera, when the vehicle stops within the vehicle stop range, capture an image of the periphery of the vehicle, and transmits the video information to the management server,
the management server uses the AI function unit to collate the video information acquired as described above with the video information of the vehicle stop range in the third database, wherein both of video information are associated with the location information,
determines the stop position of the vehicle based on the result of the above collation,
displays the stop position on the map, and
notifies the user terminal of the stop position displayed on the map.

2. Self-driving vehicle stop position notification system according to claim 1, wherein the third database comprising:
screen date for displaying and registering the vehicle stop range on a screen;
map date for displaying on the screen;
location information for specifying a start and end points of the vehicle stop range on the map; and
video information of an area around the start and end points.

3. Vehicle stop range registration method on the third database used in the automatic driving vehicle stop position notification system according to claim 1, comprising:
a step of displaying a screen for registering the vehicle stop range in the automatic driving support application downloaded to the user terminal or the self-driving control device;
a step of designating a start point and an end point of the vehicle stop range on the map displayed on the screen;
a step in which a user gets on the self-driving vehicle, causes the self-driving vehicle to ran automatically, starts the camera to shoot the periphery of the vehicle,
a step of location information registering the start point when the self-driving vehicle passes the start point of the vehicle stop range, and registering the end point when passing the end point;
a step of transmitting the video information captured by the camera and the location information to the management server;
a step of registering in the third database based on the video information and the location information received in the management server.

* * * * *